SERVO APPARATUS FOR MANUAL OPERATION OF A TAPE RECORDER

Filed April 16, 1970 3 Sheets-Sheet 1

Inventor:
IMRE SILLER
By: Michael S. Striker
Attorney

SERVO APPARATUS FOR MANUAL OPERATION OF A TAPE RECORDER

Filed April 16, 1970 3 Sheets-Sheet 2

Inventor:
IMRE SILLER
By: Michael S. Striker
Attorney

Inventor:
IHRE SILLER
By: Michael S. Striker
Attorney

United States Patent Office 3,626,782
Patented Dec. 14, 1971

3,626,782

SERVO APPARATUS FOR MANUAL OPERATION OF A TAPE RECORDER

Imre Siller, Nuremberg, Germany, assignor to Grundig E.M.V. Elektro-Mechanische Versuchsanstalt, Furth am Bayern, Germany Filed Apr. 16, 1970, Ser. No. 29,017
Claims priority, application Germany, Apr. 26, 1969, P 19 21 343.5
Int. Cl. G05g *13/02*
U.S. Cl. 74—483 PB 11 Claims

ABSTRACT OF THE DISCLOSURE

A servo apparatus, which reduces the manual force required for the operation of the pushbuttons of a tape recorder, has a driven cam, and an operating member with a cam follower for moving an actuating lever to an operative position for starting an operation of the tape recorder. When any pushbutton is depressed, a coupling means is placed in a position guiding a control lever on the respective operating member to a position engaging the actuating lever so that the operating member is blocked against rotation and is moved by the rotary cam to the operative position.

BACKGROUND OF THE INVENTION

The present invention relates to a tape recorder in which all operations, such as recording, start, playback, rapid advance, and rapid return which require a substantial manual force to be exerted on the respective pushbuttons are accomplished by the intermediary of a servo apparatus with an additional power source driving a cam which supplies the actuating force. The purpose of the servo apparatus is to obtain substantial actuating forces for shiftable members of the tape recorder, while only light finger pressure is required on the pushbuttons. Tape recorders which are not provided with a servo apparatus, require substantial manual pressure on the pushbuttons, which is considered undesirable and objectionable.

It has been proposed to use electromagnets as a servo apparatus, but such an apparatus is not only very expensive to manufacture, but also causes loud disturbing noises upon shifting of the electromagnets.

Another tape recorder according to the prior art uses a driven eccentric cam, but the arrangement is such that only one specific operation can be carried out by the power supplied by the cam. For several operations, such as recording, playback, rapid advance, and rapid return, a servo apparatus has to be provided for each pushbutton, which is expensive. Furthermore, latches are required for locking each servo apparatus, which have to be released and cause noise.

It is one object of the invention to provide a tape recorder with a compact servo apparatus requiring little space and being common to all actuating means by which operations of the tape recorder are initiated.

Another object of the invention is to provide a simple and efficient servo apparatus for connecting the manually operated means of a tape recorder with actuating means effecting the start of an operation of the tape recorder.

SUMMARY OF THE INVENTION

With these objects in view, one embodiment of the invention comprises supporting means, such as a nonrotatable shaft; a driven cam mounted on the same for rotation and having an endless cam track; a biassed control device mounted on the supporting means for movement radially to the axis of the cam between a normal inoperative position engaging the cam and rotating with the same, and an operative position; actuating means having an actuating position for initiating a function of the tape recorder and being biassed to a normal position of rest, the actuating means being engaged by the control device in the operative position and moved to the actuating position; and manually operated means associated with a function of the actuating means and being movable to and from a guiding position for guiding the control device rotating in a normal position, in radial direction to an engaging position engaging the actuating means so that in the same block rotation of the control device during further rotation of the cam. As a result, the control device is moved by a lobe of the cam track to the operative position and moves the actuating means to the actuating position.

In the preferred embodiment of the invention, a plurality of actuating means is respectively associated with a plurality of manually operated means, and with different functions of the tape recorder. Each manually operated means is independently operable to and from a guiding position for guiding the control device to the engaging position engaging the respective actuating means whereby the same is moved to the actuating position. When any pushbutton is depressed, a guide means is placed in the circular path of movement of the control device for blocking rotation of the same so that only the respective actuating member is shifted to the operative position. This arrangement is very compact and space saving although several actuating means associated with different operations of the tape recorder, can be selectively operated under the control of selected pushbuttons.

According to another feature of the invention, the pushbuttons which control the servo apparatus, or these pushbuttons and other pushbuttons which do not control the servo apparatus, are combined in a keyboard similar to the keyboard of a calculator.

The pushbuttons are connected so that each pushbutton is returned to its normal position of rest when any other pushbutton is operated. The actuating means operated by different pushbuttons may perform functions such as moving a coupling roll, or placing a change wheel in a meshing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
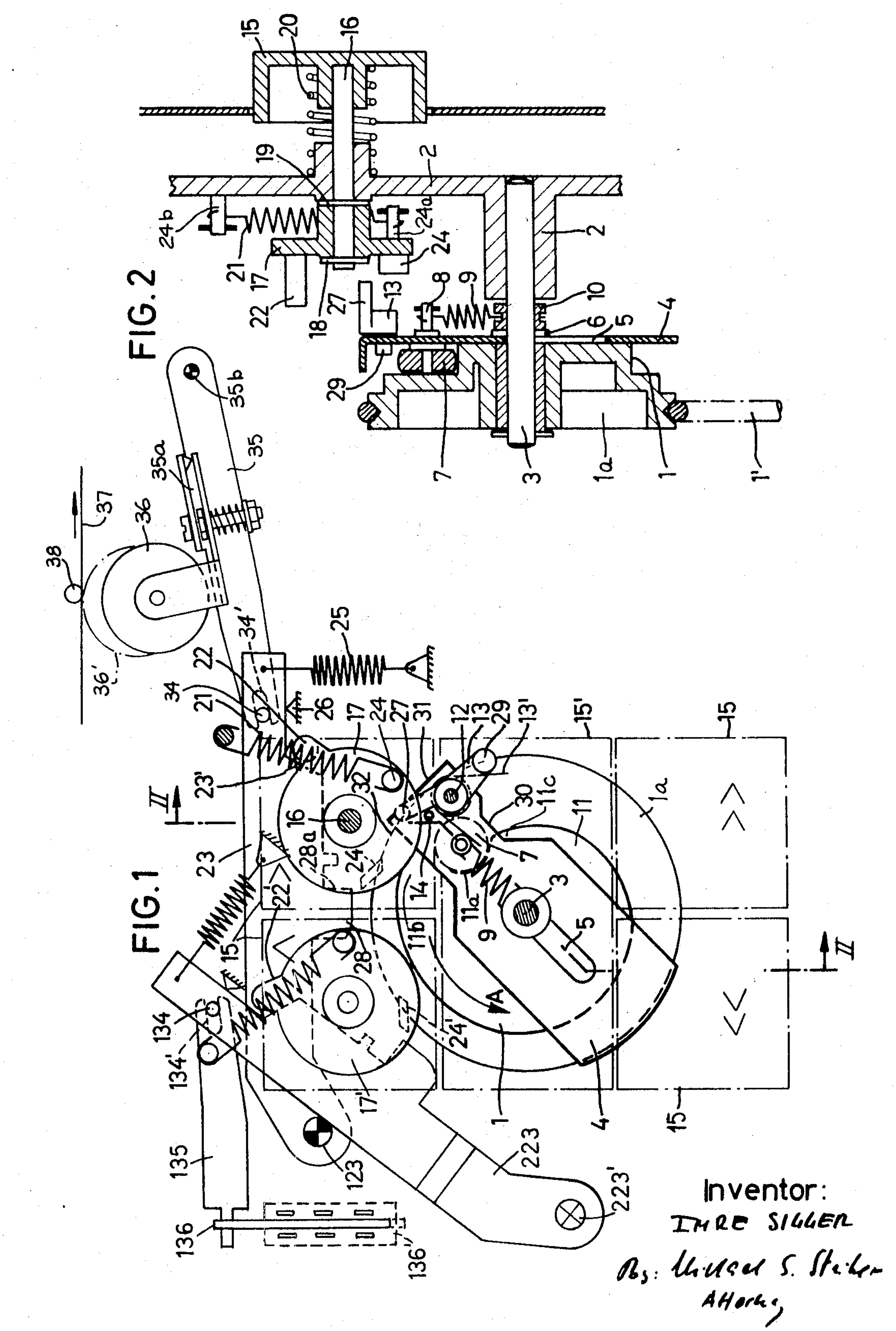
FIG. 1 is a plan view illustrating a servo apparatus according to the invention in a normal position of rest.
FIG. 2 is a sectional view taken on line II—II in FIG. 1.

Referring first to FIGS. 1 and 2, a supporting means 2 mounts a fixed shaft 3 on which a cam 1 integral with a pulley 1*a* is mounted for rotation. A belt 1' drives pulley 1*a* and rotates cam 1 continuously. The other pulley, not shown, is driven from the motor of the tape recorder, or by a flywheel, not shown. Instead of the pulley and belt transmission, another transmission using gears or worm gears may be used. A control device is mounted on shaft 3, and includes an operating member 4 having a radial slot 5, through which shaft 3 passes so that operating member 4 is turnable with cam 1, but also shiftable in radial direction between the position shown in FIG. 1 and the operative position shown in FIG. 4 in which an actuating lever 23 is displaced against the action of a spring 25 to an actuating position.

A spring 9 is connected to a pin on operating member 4 and to a bushing 10 on shaft 3, so that the operating member 4 is urged to the position of FIG. 1 in which shaft 3 abuts the end of slot 5. A cam follower roller 7 is mounted on operating member 4 and is biassed with the same by spring 9 to abut the peripheral cam track of cam 1. In the normal position of rest of the apparatus shown in FIG. 1, cam follower roller 7 is located in a recess 11*a* in the cam track 11. A higher lobe 11*b*, and a lower lobe 11*c* are provided on opposite sides of recess 11*a* to maintain cam follower roller 7 coupled with cam 1 in the normal inoperative position shown in FIG. 1. The control device further includes a control lever 13 which is mounted on a pivot 12 for angular movement. A torsion spring 13 is mounted on pivot 12 and biasses control lever 13 to the normal position abutting a stop 14 on operating member 4. Control lever 13 has another position shown in FIGS. 3 and 4 in which its projection 29 abuts a recess 30 in operating member 4.

Figure 6:
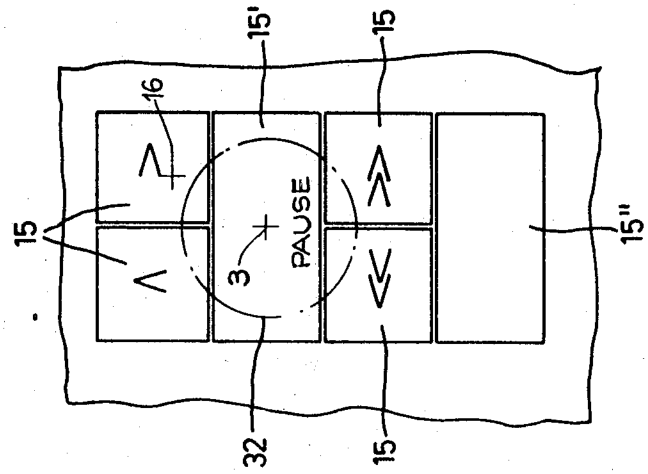
FIG. 6 is a plan view illustrating the pushbuttons in a different keyboard arrangement, also shown in FIG. 1.

As shown in FIGS. 1 and 6, pushbuttons 15, respectively associated with functions of the tape recorder, such as recording, start, rapid return, and rapid advance are arranged in two rows in a keyboard, and a larged pushbutton 15' causing a pause in the respective selected operation is provided between pushbuttons 15. A "stop" pushbutton 15'' completes the rectangular field of the keyboard, and is not shown in FIG. 1. Pushbuttons 15' and 15'' do not require a substantial force for operation, and are consequently not actuated by the servo apparatus.

Figure 5:
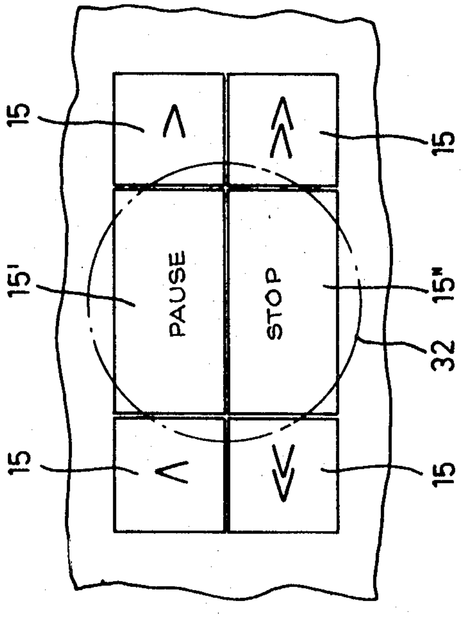
FIG. 5 is a plan view illustrating the pushbuttons of the tape recorder arranged in two rows and forming a keyboard.

In a modified arrangement of the keyboard, pushbuttons 15 are separated by the pushbuttons 15' and 15'', as shown in FIG. 5.

In FIG. 2, only a single pushbutton 15 is shown which is associated with the "start" operation by which driving of the tape at a speed required for recording and playback is obtained. Pushbutton 15 has a fixed shaft 16 to which a coupling means 17 is secured. Washers 18 and 19 determine the axial position of coupling means 17. A spring 21 is secured to an eccentric pin 24*a* on coupling means 17, and to a pin 24*b* on the supporting means 2 so that the coupling means 17 is biassed to turn about shaft 16 to a position in which a projection 22 thereon abuts a slanted face 23' on actuating lever 23. On the circular disc of coupling means 17, a guide means 24 is mounted which cooperates with the projecting portion 27 of control lever 13. Upon depression of pushbutton 15, guide means 24 is placed in the circular path 32 along which projection 27 moves when operating member 4 in the position of FIG. 1 rotates with cam 1. The circular path 32 is shown in broken lines, and it will be seen that a guide face of guide means 24 is located in this path, so that projection 27 can be guided toward a rectangular abutment shoulder 28*a* of a projection 28 on actuating lever 23.

Figure 4:
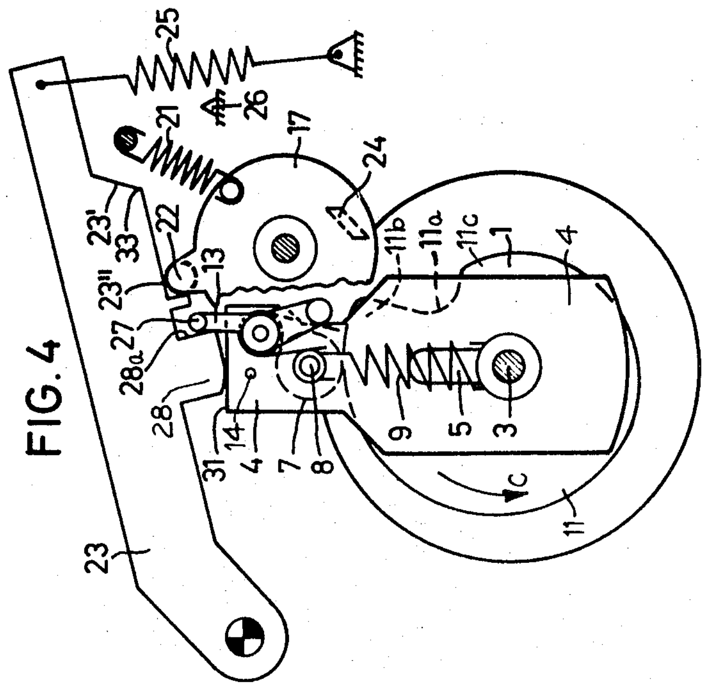
FIG. 4 is a plan view of servo apparatus in an operative position for starting an operation of the tape recorder.

Actuating lever 23, which is mounted on a pivot 123 on supporting means 2, carries a pin 34 which is located in a slot 34' of a lever 35 which carrier resilient supporting means 35*a* for a friction roller 36. A tape 37 located between friction roller 36 and a roller 38, is driven when friction roller 36 is moved to the position 36' shown in dash and dot lines, cooperating with roller 38. FIG. 1 shows actuating lever 23 in the normal position of rest, in which lever 35 is held in a position in which roller 36 does not effect movement of tape 37. When actuating lever 23 is moved to the actuating position shown in FIG. 4, lever 35, not shown in FIG. 4, is displaced about pivot 35*b* to a position in which friction roller 36 is in the position 36' and drives the tape 37 so that the same can be used for recording or playback.

OPERATION

In the normal position of rest of the apparatus shown in FIG. 1 and FIG. 2, cam 1 is rotated from the drive motor of the tape recorder through the transmission 1', 1*a*. Since the spring 9 holds cam follower roller 7 in the recess 11*a*, the control device 4, 7, 13, 27, 29 is coupled with cam 1 and rotates with the same. During this rotation, projection 27 moves along the circular path 32 of which a small portion is shown in broken lines in FIG. 1, but cannot engage the guide means 24 since the same is located in another plane, as best seen in FIG. 2, due to the fact that the spring 20 holds pushbutton 15 in a normal position of rest.

A ring 6 and cam 1 determine the axial position of the control device, but permit radial movement of the control device.

Coupling means 17, 22, 24 is urged by spring 21 to a position in which the projecting pin 22, which has a greater axial length than guide means 24, abuts the slanted face 23' of actuating lever 23 which is held by spring 25 in the normal inoperative position abutting a stop 26 of supporting means 2.

Figure 3:
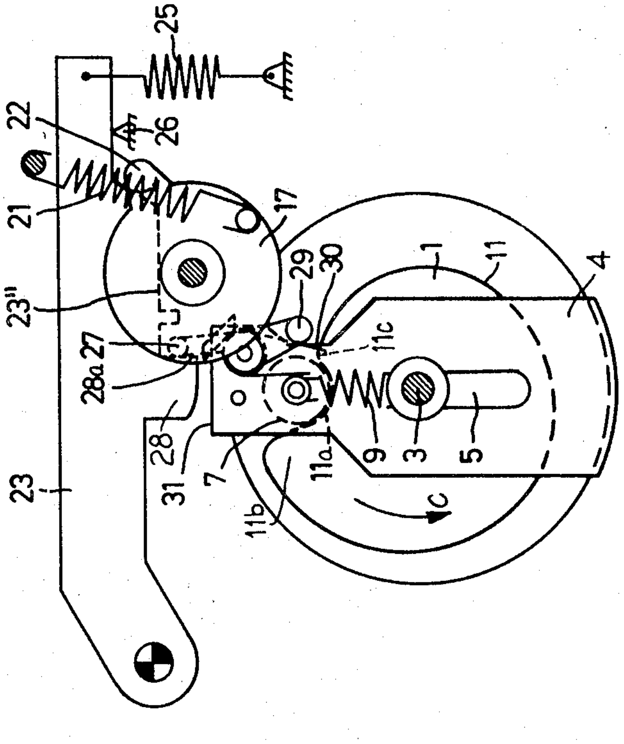
FIG. 3 is a plan view of the servo apparatus in an intermediate position.

When the illustrated pushbutton 15, or one of the other pushbuttons 15, not shown in FIG. 2, is depressed, coupling means 17, 24, 22 is moved into the plane in which projection 27 of control lever 13 rotates along the circular path 32 so that control lever 13 is turned against the force of torsion spring 13' in clockwise direction until projection 27 is guided onto the abutment shoulder 28*a* of actuating lever 23 and slides along the same to the position shown in FIG. 3 in which projection 29 on the other end of control lever 13 abuts a recess portion 30 of operating member 4, and cannot turn farther in clockwise direction. The control device 4, 13, 7 is now rigidly coupled with the stationary actuating lever 23, and cannot turn any more with cam 1 which continues to rotate in the direction of the arrow C so that cam follower roller 7 moves over the low cam lobe 11*c* and rides during further continuation of the same revolution of cam 1 up to the high lobe 11*b*, while rotating about its pivot 8. Operating member 4 is displaced in radial direction to the operative position shown in FIG. 4, the slot 5 permitting this movement until shaft 3 is located at the other end of slot 5. The abutment face 31 of operating member 4 has engaged the projecting portion 28 of actuating lever 23 during movement of cam follower roller 7 onto the high cam lobe 11*b*, and in the position of FIG. 4, actuating lever 23 has been displaced to an actuating position against the action of spring 25 so that the lever 35, see FIG. 1, is now in a position in which the friction roller 36 engages the tape 37 in the position 36' so that movement of the tape is started.

Since in the operative position of FIG. 4, projection 22 of coupling means 17 is released by the slanted shoulder 23' of actuating lever 23, spring 21 is effective to turn coupling means 17 in counterclockwise direction until projection 22 abuts a projection on actuating lever 23 and also the edge 23" so that actuating lever 23 is held in the actuated position. Turning of coupling means 17 also results in displacement of guide means 24 to a position located spaced from the path of movement of the control lever 13.

During further rotation of cam 1, cam follower roller 7 moves over the high lobe 11*b* and drops into recess 11*a* so that the control device is again coupled with cam 1 for rotation. Shoulder 28*a* releases projection 27 of control lever 13, so that spring 13' turns control lever 13 in counterclockwise direction back to the initial position shown in FIG. 1 abutting stop 14.

Each pushbutton 15 is maintained in the depressed position by a conventional interlocking device, not shown, so that actuating lever 23 remains in the actuating position of FIG. 4 until another pushbutton 15 is operated and causes release of the first operated pushbutton, and return of the same to its normal position of rest. When pushbutton 15 is in the normal position, projection 22 releases the edge 23" of the respective actuating lever 23, so that spring 25 returns the respective actuating lever 23 to its normal position shown in FIG. 1 abutting stop 26. Lever 35 withdraws friction roller 36 to the inoperative position shown in solid lines in FIG. 1.

As best seen in FIG. 1, and also shown in FIG. 6, the pushbuttons 15 are so arranged that they are located over the circular path 32 along which projection 27 of control lever 13 moves. More particularly, the guide means 24 of each manually operated means 15, 17, 24, is located directly over the circular path 32, and can be placed in the path of movement of projection 27 by actuation of the respective pushbutton. The other actuating levers which are respectively associated with pushbuttons 15 and the respective functions of the same, are arranged correspondingly about the axis of shaft 3 and of circular path 32 so that all four actuating levers respectively controlling and initiating the functions of recording, start, rapid advance and rapid return, can be operated by the power supplied from the motor of the tape recorder to the cam 1 and operating member 4.

FIG. 1 shows in addition to actuating lever 23, another actuating lever 223 associated with the recording function of the tape recorder, and controlled by the pushbutton 15 shown in the upper left part of FIG. 1. Actuating lever 223 is mounted on a shaft 223' and is biassed by a spring 25'. A coupling means 16', 22', 24' is mounted on a shaft 16'. When pushbutton 15 on the left is depressed, coupling means 17, 22', 24' performs the operations described above and actuating lever 223 acts through the pin and slot connection 134, 134' on lever 135 which shifts the actuator 136 of a switch 136' so that the circuits required for "recording" are activated.

The pushbuttons associated with recording, start, rapid advance, and rapid return require a greater manual force than pushbuttons effecting a stop or a pause in the driving of the tape, and are consequently connected by the servo apparatus to the respective four actuating levers 23. Pushbuttons 15' and 15" require only little force for actuation, and are consequently not operated by the servo apparatus of the invention. However, it is an advantage of the invention that the same servo apparatus can be used for four, or more actuating levers 23 initiating different functions and operations of the tape recorder. This advantage is particularly obtained when the pushbuttons 15 are arranged in two rows adjacent each other to form a keyboard within a rectangular area, as shown in FIGS. 5 and 6. Due to this position of pushbuttons 15, it is possible to place the same over the circular path 32 of control lever 13 so that the respective guide means 24 are directly located in the circular path of control lever 13 when the respective pushbutton 15 is depressed. The arrangement of the pushbuttons 15, 15', 15" as shown in FIGS. 5 and 6 resembles the keyboard of a desk calculator, and the positions of the pushbuttons can be easily remembered so that the operator can select pushbuttons without looking at the keyboard. The position of shafts 16 and 3 is schematically indicated in FIG. 6 by a cross.

It will be understood that each of the elements described above, or two or more together, may also find a useful application in other types of servo apparatus for manual operation of a tape recorder differing from the types described above.

While the invention has been illustrated and described as embodied in a servo apparatus supplying power to a plurality of manually operated function keys of a tape recorder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Servo apparatus for manual operation of a tape recorder, comprising, in combination, supporting means; a driven cam mounted on said supporting means for rotation about an axis, and having an endless track having a lobe; a biassed control device mounted on said supporting means for rotation about said axis, and for movement radially to said axis between a normal inoperative position engaging said cam and rotating with the same, and an operative position; actuating means having an actuating position for initiating at least one function of the tape recorder and being biassed to a normal position of rest, said actuating means being engaged by said control device in said operative position and moved to said actuating position; and manually operated means associated with said actuating means, and being movable to and from a guiding position for guiding said control device rotating in said normal position, in radial direction to an engaging position engaging said actuating means so that said actuating means block rotation of said control device during further rotation of said cam so that said control device is moved by said cam lobe to said operative position and moves said actuating means to said actuating position.

2. Apparatus as claimed in claim 1 wherein said actuating means includes a plurality of actuating members; and said manually operated means include a plurality of operating members associated with different functions of the tape recorder and with said actuating members, respectively; and wherein each manually operated member is independently operable to and from said guiding position for guiding said control device to said engaging position engaging the respective associated actuating member whereby the same is moved to said actuating position.

3. Apparatus as claimed in claim 1 wherein said control device includes an operating means mounted on said supporting means for movement to and from said operative position, and biassed to engage said cam track in said normal position, and a control means mounted on said operating means for movement between a normal position and an engaged position engaging said actuating means and abutting said operating means so that the latter is blocked against rotation with said cam and displaced to said operative position by said lobe of said rotating cam; and wherein said manually operated means include a guide means located in said guiding position in the circular path of said control means turning with said cam in said normal position of said operating means, so that said control means is guided to said engaged position by said guide means.

4. Apparatus as claimed in claim 3 wherein said control device includes a cam follower mounted on said operating means; and wherein said cam track has a recess engaged by said cam follower in said normal position of said control device.

5. Apparatus as claimed in claim 4 wherein said supporting means includes a shaft; wherein said operating means has a radial slot through which said shaft passes; wherein said cam follower includes a roller rotatably mounted on said operating means; and wherein said control device includes a spring connecting said supporting means with said operating means for urging said roller into engagement with said recess in said normal position of said control device so that said control device rotates with said cam.

6. Apparatus as claimed in claim 4 wherein said cam track has said lobe adjacent the leading side of said recess, another smaller lobe on the other trailing side of said recess, and a gradually raising cam track portion between said lobes.

7. Apparatus as claimed in claim 6 wherein said manually operated means include a pushbutton mounted on said supporting means for movement between a normal position and a depressed position, a coupling device mounted on said pushbutton for movement with the same and including said guide means, said guide means being in said guiding position when said pushbutton is in said depressed position.

8. Apparatus as claimed in claim 7 wherein said coupling device is mounted on said pushbutton for angular movement about an axis and is movable with said pushbutton in axial direction, including a spring biassing said coupling device to abut said actuating means so that said coupling device turns with said guide means when said actuating means moves between said positions of the same and so that said actuating means is held in said actuating position by said coupling device until said cam follower engages said recess at the end of one revolution of said cam.

9. Apparatus as claimed in claim 1 wherein said cam has a recess; wherein said actuating means includes an actuating lever having an abutment shoulder; wherein said control device includes an operating means mounted on said supporting means and having a cam follower, and a spring biassed control lever turnably mounted on said operating means and having two end positions for rigidly abutting the same, said control lever having one end moving along a circular path in said normal position; wherein said manually operated means include a pushbutton and a guide means movable to and from said guiding position located between said path and said shoulder so that said one end of said control lever is turned and guided into engagement with said abutment shoulder by said guide means while said other end of said control lever abuts said operating means whereby said abutment shoulder and control lever block turning movement of said control device with said cam so that said cam turns relative to the same and shifts by said lobe said operating means to said operative position engaging said actuating lever and turning the same to said actuating position until at the end of one revolution said cam follower enters said recess, and said control device and said control lever move to said normal positions.

10. Apparatus as claimed in claim 9 wherein said actuating means include a plurality of said actuating levers; and wherein said manually operated means include a plurality of pushbuttons and a plurality of guide means associated with different functions of the tape recorder, and with said actuating members, respectively; wherein each manually operated pushbutton is independently operable for moving the respective guide means to and from said guiding position; wherein each guide means in said guiding position is located in said circular path of said one end of said control lever for guiding said control lever into engagement with the abutment shoulder of the respective actuating lever whereby said operating means moves the respective actuating lever to said actuating position thereof while all other actuating levers remain in said normal position of rest.

11. An apparatus as claimed in claim 10 wherein said manually operated pushbuttons are arranged in at least two rows adjacent each other and form a keyboard; and wherein said pushbuttons are located over said circular path.

References Cited

UNITED STATES PATENTS

| | | | |
|---|---|---|---|
| 3,373,913 | 3/1968 | Atsumi | 226—176 |
| 3,450,323 | 6/1969 | Evans | 226—176 |

MILTON KAUFMAN, Primary Examiner

U.S. Cl. X.R.

74—10.29; 226—176